(12) United States Patent
Kojima

(10) Patent No.: US 7,500,719 B2
(45) Date of Patent: Mar. 10, 2009

(54) SEAT APPARATUS

(75) Inventor: Kiyoyuki Kojima, Komaki (JP)

(73) Assignees: Imasen Denki Seisakusho, K.K., Inuyama (JP); Nihon Matsujo, K.K., Yokohama (JP)

( * ) Notice: Subject to any disclaimer, the term of this patent is extended or adjusted under 35 U.S.C. 154(b) by 154 days.

(21) Appl. No.: 11/420,796

(22) Filed: May 29, 2006

(65) Prior Publication Data

US 2008/0100115 A1    May 1, 2008

(30) Foreign Application Priority Data

May 31, 2005   (JP)   ............................. 2005-158350
May 29, 2006   (JP)   ............................. 2006-147814

(51) Int. Cl.
*B60N 2/22*   (2006.01)
*B60N 2/23*   (2006.01)

(52) U.S. Cl. ................................. 297/362; 297/362.11

(58) Field of Classification Search ................. 297/362, 297/362.11

See application file for complete search history.

(56) References Cited

U.S. PATENT DOCUMENTS

| 5,248,184 | A | * | 9/1993 | Morris | .................... 297/362 X |
| 5,435,624 | A | * | 7/1995 | Bray et al. | ............. 297/362.11 |
| 5,702,155 | A | * | 12/1997 | Ito | ......................... 297/362.11 |
| 6,869,143 | B2 | * | 3/2005 | Secord | ....................... 297/362 |
| 7,066,543 | B2 | * | 6/2006 | Yu | .......................... 297/362 X |
| 2002/0089223 | A1 | * | 7/2002 | Yu | ......................... 297/362.11 |

* cited by examiner

*Primary Examiner*—Rodney B. White
(74) *Attorney, Agent, or Firm*—Hiroe & Associates; Michael L. Crapenhoft

(57) ABSTRACT

A seat apparatus allows a seat back to incline forward and to return to an upright position under control from a position inside a passenger vehicle away from the seat. A wire and an operation member are interlocked with an unlocking lever of a reclining unit. The apparatus can include a driving unit which can cause the seat back to incline forward. A rotation unit can be included in a reclining unit. When a notch on a rotating sector gear in the rotation unit comes into contact with a projection on a seat back side bracket, the seat back can be raised from an inclined position to a more upright position.

10 Claims, 11 Drawing Sheets

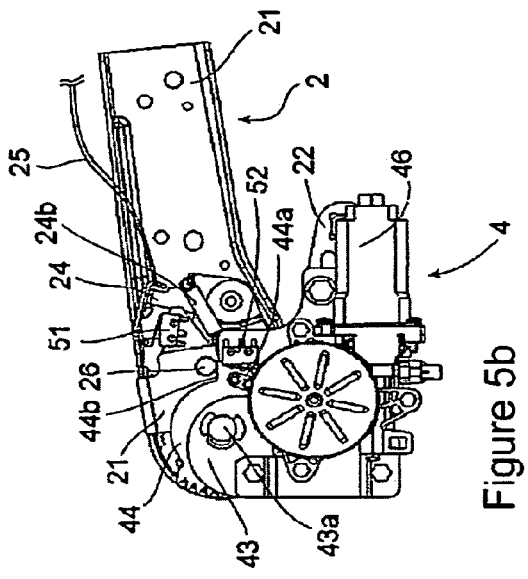
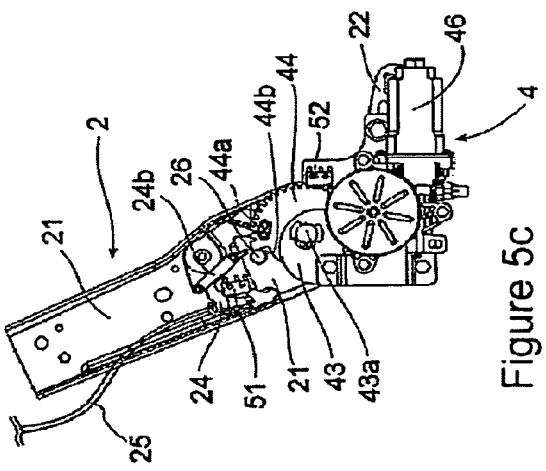
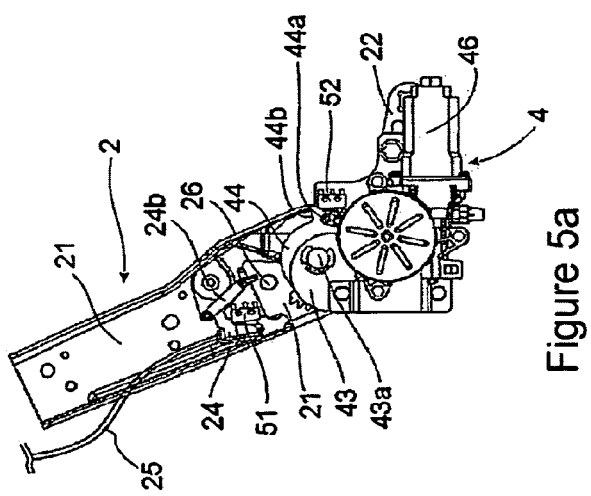

SEAT APPARATUS

TECHNICAL FIELD OF THE INVENTION

The present invention relates to a seat apparatus for vehicle or the like, particularly to a seat apparatus suitably mounted in the rear side of a vehicle or the like.

BACKGROUND ART

Conventionally, a one-box type vehicle represented by a "mini-van" and the like is equipped with two or three rows of seats in its interior. Some of the seats are equipped with a "reclining unit", which adjusts the inclination angle of a seat back thereof. In such case, the reclining unit is ordinarily provided on a side face of the seat. However, when the "seat of the second or third row" is designed for three occupants, since the width of the seat has roughly the same dimension as the width of the interior space, a space between the side face of the seat and the inner wall of the vehicle is extremely narrow. Under such conditions, in the seat of the second or third row, when the reclining unit and a free hinge are attached to the both side faces of the seat, a hand of an occupant hardly reaches up to the reclining unit. Therefore, when unlocking the seat back, there may be a case where the occupant experiences a difficulty to operate the lever. Therefore, to facilitate the lever operation of the reclining unit, the operation lever of the reclining unit is preferably disposed at a position easy to operate for the occupant.

As a means as described above, for example, conventionally, an art disclosed in a patent document 1 is known. In the art disclosed in the patent document 1, a handle (10) is disposed in the upper face of the seat back, and the handle (10) and an operation arm (30, 33) for unlocking a reclining unit are connected to an operation lever (9). When the handle (10) is operated, the operation arm (30, 33) of the reclining unit can be operated. According to such art, by operating the handle (10) in the upper face of the seat back, the reclining unit can be operated. Therefore, the space in the vicinity of the seat side face is not required.

In a vehicle equipped with three row seats, generally, occupants get onto the third row seat from a rear side door. However, when occupants get onto/off from the third row seat, the second row seat positioned immediately before the third seat blocks a path for occupants to get into/off the vehicle. Therefore, the second row seat is added a "walk-in function" to permit the second row seat to be slid in the forward/backward direction.

As a "walk-in function" as described above, for example, an art disclosed in a patent document 2 is conventionally known. The art disclosed in the patent document 2 includes a hand switch, which is disposed at a position away from a seat cushion (13) like the vicinity of driver's seat, and a motor (53), which is disposed at a lower portion of the seat cushion (13). According to such art, when the hand switch is operated, the motor (53) provided in a lower portion of the seat cushion (13) is activated and a cam (53b) is rotated to draw a wire cable (53d), and a manual operation lever (18) is rotated to function the walk-in function; or, the seat back is returned to an ordinary position and the seat is moved forward/backward by a motor (57) and a warm gear pair through an electrical control. That is, a series of operations from activation of the walk-in function to the returning of the seat back can be carried out from a position away from the related seat.

Also, in a vehicle such as a mini-van, a variety of seat arranges are required in accordance with the occupants' application purpose and utilization. As typical examples, the following examples are given. That is, a cargo room space is enlarged by largely moving the second and third row seats in the forward and backward directions; or, the second and third row seats are brought closer to each other and the seat back of the second row or third row seats is inclined forward (forward inclination) to use the rear face of the second row seat as a table, or the like.

After the seatback is folded by being inclined forward (full inclination) to use the rear face thereof as a table or to utilize the rear side of the body as a cargo room as described above, to reset the seat to sit thereon again, the occupant have to carry out such works to open a door at the side of the body, to raise the seat back by hands, and the like. Such works require considerable time and energy and are extremely troublesome. Therefore, it is preferred that such a seat as described above is given with a "seat back raising device", which is capable of causing the seatback to rise through a switch operation from a position away from the seat.

As a "seat back raising device", for example, an art disclosed in a patent document 3 is conventionally known. In the art disclosed in the document, a reclining unit is disposed at one side of the seat back and a free hinge (3) is disposed at the opposite side thereof, a wire (16) is connected to the free hinge (3), and the wire (16) is wound by means of a device constructed of a sector gear (7), a speed reduction gear (6), an electrical driving unit (5) and a one-way clutch bearing (10), thereby the seat back is raised. According to the above art, a switch for activating the device is disposed in a position away therefrom like driver's seat, and by operating the switch therefrom, the seat back can be raised from a position away therefrom in the interior of the vehicle. And since only a free hinge and a unit have to be attached to a conventional seat, the assembly of them is simple and thus the above art is useful.

[Patent document 1] Japanese Unexamined Utility Model Application No. (Hei) 3-27743

[Patent document 2] Japanese Unexamined Patent Application No. (Hei) 5-16714

[Patent document 3] Japanese Unexamined Patent Application No. 2001-239862

DISCLOSURE OF THE INVENTION

Problem to be Solved by the Invention

The seat apparatus disclosed in the patent document 1 is provided with a handle in the upper face of the seat back, and the handle and an operation arm of the reclining unit are connected to the operation lever, and is arranged so that, by manually operating the handle, the operation arm of the reclining unit is operated to release the lock. In such a seat apparatus, ordinary reclining operation is manually carried out smoothly. However, after the seat back is inclined forward to enlarge the space of the cargo room, or utilized as a part of a table or the cargo room; and after that, when the seat back is returned to the ordinary position to reset the seat, it is convenient to return the seat back through only the switch operation from a position away therefrom.

Also, the seat apparatus disclosed in the patent document 2 is arranged so that, the wire is drawn by a motor disposed in a lower portion of the seat cushion, and when the manual operation lever is rotated, the walk-in function is activated; and thus, the seat back is raised by means of the warm gear pair and the motor disposed in the vicinity of the manual operation lever. Therefore, a series of the operations from the activation of the walk-in function to the returning the seat back to the ordinary position can be carried out from a position vicinity of the driver's seat. However, there is such a problem that various mechanisms including the motor are gathered in the lower portion of the seat; and thus, the structure thereof is complicated resulting in not only a difficulty in assembly but also an increase of manufacturing cost and risk of failure.

On the other hand, the seat apparatus disclosed in the patent document 3 is arranged so that, when the seat back is inclined forward to increase the space of the cargo room, the reclining unit attached to the one side of the seat back is operated manually, thereby the seat back is caused to incline forward; and a wire is connected to the free hinge attached to the other side to draw the same by means of the electrical drive unit and the sector gear, and thus the seat back is returned to the ordinary position. Therefore, since a relatively long distance exists from the electrical drive unit for drawing the wire to the free hinge, an allowance is generated between the one-way clutch and the wire during the operation resulting in such a problem that the operation is cased to be unstable depending on the operation conditions.

The present invention has been proposed to solve the above problems. It is an object of the present invention to provide a seat apparatus capable of operating a seat back from a position away from the related seat like the vicinity of the driver's seat without using a large device.

MEANS FOR SOLVING THE PROBLEMS

To solve the above problems, the means adopted by the present invention are as described below. That is, the seat apparatus according to the attached claim 1 has technical characteristics in that the seat apparatus includes: a seat cushion attached to a body side; a seat back attached to the seat cushion so as to be inclinable with respect thereto; and a reclining unit capable of adjusting an inclination angle of the seat back with respect to the seat cushion, the seat back being inclinable to an arbitrary position when a lock of the reclining unit is released with an unlocking device, wherein a rotation unit capable of rotating the inclined seat back is attached to the reclining unit, the rotation unit is capable of being operated from a position away therefrom in the interior of a vehicle.

Next, in the seat apparatus according to the attached claim 2 is characterized in that the reclining unit has a seat back side bracket attached to the seat back, and the seat back side bracket is formed with a projection, the rotation unit includes a motor and a rotating member, which is driven to rotate by the motor, and is formed with a notch to be engaged with the projection, when the rotating member is driven to rotate by the motor, the notch is engaged with the projection, and when the seat back side bracket is rotated, the seat back is rotated.

Also, in the seat apparatus according to the attached claim 3 is characterized in that, the rotation unit is arranged so that, when the seat back is moved from an inclined state to an uprising state and the reclining unit is locked, the engagement between the notch of the rotating member and the projection of the seat back side bracket is released through an electrical control to return the seat back to a state before the rotation.

Further, in the seat apparatus according to the attached claim 4 is characterized in that, the rotation unit is attached so that rotary shafts of the reclining unit and the rotating member are coaxial with each other.

In the seat apparatus according to the attached claim 5 is characterized in that, the unlocking device is constructed of an unlocking lever for unlocking the reclining unit, a connecting member connected to the unlocking lever, an operation member capable of operating the unlocking lever via the connecting member, and a driving unit capable of being operated from a position away therefrom in the interior of the vehicle to operate the unlocking lever via the connecting member in place of operating the operation member, wherein the driving unit includes a motor, a disk driven to rotate by the motor, a link attached to the disk, which is arranged so as to perform linear movement when the disk performs a rotational movement, and a link piece attached to an end portion of the link, through which the connecting member is slidably inserted, and which is capable of being engaged with the front end of the connecting member, wherein, when the link performs a linear movement, the link piece engages with a front end of the connecting member to operate the connecting member and thereby operates the unlocking lever.

In the seat apparatus according to the attached claim 6 is characterized in that, the driving unit and the rotation unit are arranged so that the operation of the respective units is detected through a control circuit to prevent one unit from operating while the other unit is in operation.

In the seat apparatus according to the attached claim 7 is characterized in that, the reclining unit is fixed to a seat cushion side bracket, the seat cushion side bracket is fixed to an upper rail in a seat rail, the upper rail is engaged slidably with respect to a lower rail fixed to a floor face of the vehicle, wherein the reclining unit is provided with a rotary drum that rotates simultaneously together with the rotating member of the rotation unit, wherein the rotary drum is connected to one end of a wire cable and the other end of the wire cable is connected to the end portion of the lower rail, wherein the rotary drum rotates simultaneously together with the rotating member to wind the wire cable, and thereby the reclining unit provided on the upper rail slides on the lower rail.

And in the seat apparatus according to the attached claim 8 is characterized in that, the upper rail in the seat rail is provided with a lock lever for restraining or releasing the slide with respect to the lower rail, wherein, the seat cushion side bracket fixed onto the upper rail includes: a holding link that, when the seat back is inclined forward, engages with the lock lever and operates the lock lever to release the slide restriction with respect to the lower rail; a memory link capable of engaging with the holding link and releasing thereof for maintaining a state that the holding link has released the slide restriction; and a memory release lever connected to the memory link at one end portion thereof capable of releasing the engagement with the holding link by the memory link, wherein, when the other end portion of the memory release lever comes into contact with a rearmost detection hook provided to the lower rail, the memory link interlocked to one end portion of the memory release lever is pushed out to release the engagement with the holding link by the memory link and releases the operation of the lock lever by the holding link, and thereby the forward/backward slide restriction of the upper rail member with respect to the lower rail is resumed.

EFFECT OF THE INVENTION

First of all, in the seat apparatus according to the attached claim 1, a rotation unit that rotates a seat back in a state that the reclining unit is unlocked and inclined is mounted to the reclining unit. Since the unit is disposed on a member to be driven (reclining unit), reliable operation is carried out. Also, the unit is directly mounted to the member to be driven. Therefore, each member to be driven can be driven by each unit. Further, a simple structure is achieved in a small size and is readily mounted thereto accordingly. Furthermore, since the rotation unit can be operated from a remote position away therefrom, the rotation operation to raise the inclined seat back to the ordinary position can be conveniently carried out from the driver's seat.

Next, in the seat apparatus according to the attached claim 2, in addition to the above effect of the attached claim 1, the projection is formed on the seat back side bracket of the reclining unit and is arranged so as to engage with the notch formed on the rotating member of the rotation unit. Therefore, when the rotating member is driven to rotate by a motor, the seat back is rotated. Owing to such arrangement, when the rotation unit is mounted to the reclining unit, as for the reclining unit, only the projection has to be formed on the seat back side bracket. Therefore, such effect can be obtained that the rotation unit can be readily mounted also on a reclining unit of a conventional seat.

Also, in the seat apparatus according to the attached claim 3, in addition to the above effect of the attached claim 1 or 2, the rotation unit is controlled so that, when the seat back is returned from a inclined state to an uprising state and the reclining unit is locked, the seat back is caused to return to the state before the rotation again. By arranging as described above, unless the seat back is inclined or the rotation unit is operated, the projection of the seat back side bracket is prevented from being engaged with the notch in the rotating member. Therefore, ordinary reclining operation of the seat back by operating the reclining unit receives no influence, and the rotation unit is also free from extra load.

Further, in the seat apparatus according to claim 4, in addition to the effect of the attached claim 2 or 3, when the rotation unit is mounted, the rotation unit is mounted coaxially with the rotary shaft of the reclining unit. Therefore, such effect is obtained that the projection on the seat back side bracket and the notch of the rotating member are reliably positioned, and the position of the rotation unit with respect to the reclining unit is reliably determined.

In the seat apparatus according to claim 5, in addition to the effect of the attached claim 1, the unlocking lever can be operated and the reclining unit can be unlocked by the driving unit from a position away therefrom via the connecting member. By arranging as described above, since the driving unit has to operate only the connecting member, the unit itself can be constructed small in size and can be readily mounted on a conventional seat. Also, since the driving unit can be mounted in the vicinity of the member to be driven (connecting member), the driving unit can be reliably operated.

Further, the unlocking lever for unlocking the reclining unit can be operated by the operation member and driving unit via the connecting member. Therefore, when the operation member and the driving unit are disposed in a position easy to operate such as the rear face of the seat back by adjusting the length of the connecting member, even when the unlocking lever is applied to the rear seat, since a hand is not requited to insert up to a reclining unit located in a side area of a limited rear space; the unlocking lever can be easy operated.

In the seat apparatus according to claim 6, in addition to the effect of any one of claims 1 to 5, the driving unit and the rotation unit are provided with the control circuit for detecting the operation of the respective units so that, when one unit is in operation, the other unit is prevented from operating. Therefore, even when one unit is accidentally attempted to operate while the other unit is in operation, the operation is prevented. Erroneous operation of the seat and danger to the occupant accordingly are prevented.

In the seat apparatus according to claim 7, in addition to the effect of any one of claims 2 to 6, at the same time when the rotating operation to raise the inclined seat back to the ordinary position is carried out, the rotary drum, which simultaneously rotates with the rotating member of the rotation unit, winds the wire cable and thereby the reclining unit is slid on the lower rail. The "inclination angle of the seat back" and the "forward/backward position of the seat rail 13" are interlocked with each other to reset the same to the state allowing the occupant to sit thereon without carrying out manual operation.

In the seat apparatus according to claim 8, in addition to the effect of any one of claims 2 to 7, when the upper rail moves up to the vicinity of the slide end on the lower rail, at point of time when the end portion of the memory release lever comes into contact with the rearmost detection hook, the forward/backward slide restriction of the upper rail member with respect to the lower rail is activated again. Therefore, the slide lock can be reset without requiring any manual operation by the occupant.

BEST MODE FOR CARRYING OUT THE INVENTION

Hereinafter, modes for carrying out the present invention will be described referring to embodiments shown in the attached drawings.

First Embodiment

FIGS. 1 to 5 show a seat apparatus 1 according to a first embodiment. As shown in FIG. 1, the seat apparatus 1 has a seat cushion 11 and a seat back 12, and in order to rotatably interlock them, a reclining unit 2 is disposed at one side of the interlocking section therebetween; and a free hinge 5 is disposed at the other end side thereof. Owing to the above arrangement, the seat back 12 can be inclined and the inclination angle thereof is adjustable. The seat back 12 is mainly applied to a rear seat of an automobile.

The seat cushion 11 is attached to the seat rails 13 disposed on a floor face of a body. At a front portion of the seat cushion 11, the upper end portions of the folding links 14 are rotatably connected thereto, and the lower end portions of the folding links 14 is rotatably supported by brackets 15 fixed to the floor face of the body. On the other hand, the seat back 12 is provided with an operation member 16 for releasing the lock of the reclining unit 2 in an upper portion thereof. Also, the seat back 12 is provided with a driving unit 3 (which will be described later) for operating the operation member 16 from a position away from the seat apparatus 1 (such as driver's seat).

Note that, in this embodiment, the reclining unit 2 is provided to only one side of the seat back 12 and the seat cushion 11 and the free hinge 5 is disposed at the other side thereof. However, such an arrangement may be adopted that reclining units are provided at the both side, and the reclining units are interlocked by means of a shaft to be rotated synchronously.

As for the reclining unit 2, a commonly used conventional reclining unit may be adopted. Particularly, for example, the following reclining units are available. That is, a reclining unit, which permits the inclination angle to be adjusted in multi-steps by operating an unlocking lever; a reclining unit, which permits the seat back 12 to swiftly incline forward (forward inclination) up to a certain angle to allow an occupant to walk in; a reclining unit, which permits the rear face of the seat back 12 to be utilized as a part of a table or a cargo room and the like. In this embodiment, since the reclining unit is intended to apply to a rear seat, a reclining unit, which permits the seat back 12 to be swiftly inclined forward up to a desired angle, is adopted. By adopting such arrangement, when the occupant operates the operation member 16, the seat back 12 can be swiftly inclined forward up to a position roughly parallel with the seat cushion 11.

Further, the reclining unit 2 in this embodiment is arranged so that, when releasing the lock, an unlocking lever 24 is not directly operated from the side of the seat, but the unlocking lever 24 can be operated through the operation member 16 provided in the upper portion of the seat back 12. Therefore, a space for operating the unlocking lever 24 is not required in a side face of the seat apparatus 1. Accordingly, when being applied to a center seat in three-occupants' seat, the present invention permits the occupant to easily operate the unlocking lever 24.

FIG. 2 is an illustration of the inside of the reclining unit 2 shown in FIG. 1 viewed from an upper portion at an angle. The reclining unit 2 itself may be a commonly used reclining unit as described above, which comprises a seat back side bracket 21 attached to the seat back 12 and a seat cushion side bracket 22 attached to the seat cushion 11. The seat back side bracket 21 is attached rotatably with respect to the seat cushion side bracket 22 on a rotary shaft 27, and a coil spring 28 constantly energizes the seat back side bracket 21 in the forward inclination direction.

These seat back side bracket 21 and the seat cushion side bracket 22 are held at a desired angle owing to the operation of a lock mechanism 23. The seat back side bracket 21 is provided with a projection 26 capable of being engaged with a rotating member of a rotation unit 4 (described later). And the lower portion of the seat cushion side bracket 22 is fixed to a bracket, which can be engaged the seat rail 13 (equivalent to unshown "upper rail").

Here, the lock mechanism 23 in the reclining unit 2 can be unlocked by an operation of the unlocking lever 24 by the occupant so as to permit the angle of the seat back 12 to be adjusted. The unlocking lever 24 is constantly energized by an energizing spring 24b in the locking direction of the lock mechanism 23. Also, the unlocking lever 24 is connected to the operation member 16 by means of a wire 25 as a connecting member, and is arranged so as to unlock the lock mechanism 23 when the operation member 16 is operated. At the front end of the unlocking lever 24, a hook 24a is formed, and when the unlocking lever 24 is not operated (a state that the reclining unit 2 is locked), the hook 24a abuts on a first limit switch 51 attached to the seat back side bracket 21 to hold the first limit switch 51 in the ON state.

FIG. 3 is an exploded perspective view of the rotation unit 4 shown in FIG. 2. The rotation unit 4 is attached to the seat cushion side bracket 22 via a mounting bracket 41. The mounting bracket 41 is arranged so that a base plate 42 is fixed thereto along with a holding bracket 43 by means of bolts 42a, 42a. In an upper portion of the base plate 42, a holding hole 42b is formed. One end of a center shaft 43a is inserted into the holding hole 42b and the other end thereof is inserted into the holding bracket 43. Owing to the above constitution, a sector gear 44 is pivoted rotatably by the center shaft 43a. The center shaft 43a is arranged so as to engage coaxially with the rotary shaft 27 of the reclining unit 2 when the rotation unit 4 itself is attached to the seat cushion side bracket 22. By adopting such arrangement, the rotation unit 4 can be reliably positioned with respect to the reclining unit 2.

One end portion of the gear holding pin 45 is inserted into a mounting hole 42c of the base plate 42, and the other end portion of the gear holding pin 45 is supported by a gear holding bracket 45c. The gear holding pin 45 is formed so that a roughly central portion thereof protrudes in a flange-like shape, and a reduction gear 45a is inserted onto one side thereof; and a transmission gear 45b is inserted onto the other side. These reduction gear 45a and the transmission gear 45b are rotated simultaneously with the gear holding pin 45. The gear holding bracket 45c is attached to the holding bracket 43 with pins 43b, 43b; and the holding bracket 43 is formed with an insertion hole 43c. And into the insertion hole 43c, the gear holding pin 45 and the transmission gear 45b are inserted.

To the holding bracket 43, a motor unit 46 is mounted and fixed with mounting pins 46a. The motor unit 46 includes a motor gear 46b and a motor 46c; and the motor gear 46b is engaged with a transmission gear 45b. When the motor gear 46b is driven by the motor 46c, the transmission gear 45b is rotated; and along therewith, the gear holding pin 45 and the reduction gear 45a are rotated simultaneously; and accordingly the sector gear 44 engaged with the reduction gear 45a is also rotated. Note that the sector gear 44 is formed with a notch 44b, and the notch 44b is arranged to engage with the projection 26 provided to the seat back side bracket 21.

Also, the sector gear 44 is provided with an operation projection 44a. When the rotation unit 4 is not operating, the operation projection 44a abuts on a second limit switch 52 fixed to the holding bracket 43 to maintain a state that the electricity is ON. Both of the first limit switch 51 attached to the seat back side bracket 21 and the second limit switch 52 fixed to the holding bracket 43 are provided to control the rotation of the motor 46c provided to the motor unit 46. When the first limit switch 51 is activated, the motor 46c is controlled to rotate in reverse direction; and when the second limit switch 52 is activated, the motor 46c is controlled to stop rotating.

FIG. 4 show the enlarged driving unit 3 shown in FIG. 1; FIG. 4A is a front view thereof and FIG. 4B is a side view thereof. As shown in FIG. 1, the driving unit 3 is disposed on a seat frame (not shown) in the vicinity of the operation member 16 for unlocking the reclining unit 2. The driving unit 3 is provided with a base board 31 for mounting the driving unit 3 itself to the seat frame. To the front face of the base board 31, a disk 32 is attached, and the disk 32 is driven to rotate by a motor unit 36 (which will be described later).

In a part of the outer edge of the disk 32, a notch 32a is formed and the disk 32 is attached to the base board 31 so that a third limit switch 53 comes into contact with the outer edge of the disk 32. The third limit switch 53 is preset to be turned OFF when the same comes into contact with the notch 32a. Also, to the disk 32, a link 33 is rotatably attached via a pin 32b. The link 33 is slidably guided in its central portion by a fixed plate 34 fixed to the base board 31. Therefore, the rotational movement of the disk 32 is converted into a linear movement by the link 33. At the front-end portion of the link 33, a link piece 35 is provided, and inside of the link piece 35, a wire 25 is inserted therethrough. The wire 25 is connected to the unlocking lever 24 of the reclining unit 2.

On the other hand, on the face of the base board 31 at the opposite side to the link 33, the motor unit 36 is mounted. The motor unit 36 has a gear section 36a and a motor 36b. The gear section 36a is engaged with a rotary shaft 32c provided at the rear side of the disk 32, and thereby, when the motor unit 36 is driven to rotate, the disk 32 follows to rotate. When the disk 32 is rotated, the link 33 slides forward/backward, and in the process that the link piece 35 is pushed outward, the link piece 35 is engaged with a front-end portion 25a of the wire 25, and pulls the wire 25 up to a slide limit of the link 33. The front-end portion 25a of the wire is connected to the operation member 16 (which is not shown in FIG. 4), and thus, when the driving unit 3 is activated as described above, performs the same function as that when the operation member 16 is operated.

Also, since the wire 25 is arranged so as to move freely in the vertical direction inside the link piece 35, even when the operation member 16 is manually operated, no load is given to the driving unit 3.

Next, the operation of the seat apparatus 1 according to the present invention will be described with reference to FIG. 5. FIG. 5 are views each showing a state of the reclining unit 2 and the rotation unit 4 when the seat apparatus 1 is operated. Particularly, FIG. 5A shows a state that the seat apparatus 1 can be used as a seat; FIG. 5B shows a state that the seat apparatus 1 is in a table mode or a cargo room mode; and FIG. 5C shows a state that the seat apparatus 1 has returned from the table mode to the ordinary position.

Ordinarily, in the seat apparatus 1 according to this embodiment, the unlocking lever 24 of the reclining unit 2 is energized by the energizing spring 24b in the locking direction of the lock mechanism 23. Owing to this, the lock mechanism 23 is set into a locked state, and the seat back side bracket 21 is held at an arbitrary angle with respect to the seat cushion side bracket 22. Therefore, the seat back 12 is held at an arbitrary angle with respect to the seat cushion 11.

On the other hand, when the reclining unit 2 is operated to adjust the inclination angle of the seat back 12, the occupant operates the operation member 16 provided to the upper portion of the seat back 12. When the operation member 16 is operated, the wire 25 connected to the operation member 16 is pulled, and the unlocking lever 24 connected with the wire 25 is rotated. When the unlocking lever 24 is operated via the operation member 16, the lock mechanism 23 is unlocked and the reclining operation is permitted, and thus the angle of the seat back 12 can be adjusted. When the occupant releases the operation member 16 at an arbitrary position, the unlocking lever 24, which is energized by the spring, rotates and locks the lock mechanism 23, and thus the seat back 12 can be held at an arbitrary position (angle).

When the operation member 16 is operated, the unlocking lever 24 is rotated and the lock mechanism 23 is unlocked, owing to the energizing force of the coil spring 28, the seat back 12 starts to incline forward. The inclination angle of the seat back 12 can be fine adjusted not only in a range permitting the occupant to sit thereon but also can be inclined forward up to a posture that the seat back 12 is roughly parallel with the seat cushion 11. By arranging as described above, the rear face of the seat back 12 can be used as a table or a part of the cargo room. Note that, when employing such table mode or cargo room mode, the forward inclination of the seat back 12 and the forward sliding of the seat rail 13 may be interlocked with each other. The seat rail 13 is constructed of an upper rail, to which the seat cushion side bracket is fixed, and a lower rail, which is slidably engaged with the upper rail and fixed to the floor face of the vehicle. The upper rail is provided with a lock lever for operating to restrain the sliding with respect to the lower rail or to release the same. When the lock lever is operated to incline the seat back side bracket 21, the forward inclination of the "seat back 12 and the forward sliding of the seat rail 13 can be interlocked with each other." In particular, it is conceivable that one end of the wire cable is connected to the lowermost of the seat back side bracket 21 and the other end of the wire cable is connected to the lock lever. When such arrangement is adopted, since one end of the wire cable is pulled by the forward inclination of the seat back side bracket 21, the lock lever, which is connected with the other end of the wire cable, is pulled up. Owing to this, the forward/backward slide lock of the seat rail 13 is released and the upper rail is caused to slide forward by the spring provided inside the seat rail 13.

Note that, the driving unit 3 permits remote operation from a position away from the seat apparatus 1. In particular, it is conceivable to dispose an operation switch (not shown), which is connected to the driving unit 3 fixed to the seat back 12, in the vicinity of the driver's seat via a wiring. When the operation switch is operated, the power is supplied and the motor 36b of the motor unit 36 is driven to rotate. When the motor 36b rotates, the disk 32 is rotated via the rotary shaft 32c, the rotational movement of the disk 32 is converted into a linear movement via the link 33 and fixed plate 34. And as shown in FIG. 1, when the driving unit 3 is provided, the link piece 35 attached to the front-end portion of the link 33 moves in the vertical direction.

As described above, since the wire 25 is inserted through the inside of the link piece 35, in the process the link piece 35 goes up to the uppermost, the link piece 35 is engaged with the front end portion 25a of the wire 25. Since the front-end portion 25a is interlocked with the operation member 16, to operate the front end portion 25a is identical to operate the operation member 16. When the wire 25 is pulled upward from the point where the link piece 35 is engaged with the front-end portion 25a up to its end, the unlocking lever 24 is rotated and the lock mechanism 23 is unlocked; and thus, the inclination angle of the seat back 12 can be adjusted.

Also, since the notch 32a is formed in the disk 32, the third limit switch attached to the base board 31 is preset so as to turns OFF at the notch 32a. The third limit switch is for controlling the motor 36b, and is arranged so that, when the motor 36b is driven to rotate due to an operation from the driver's seat or the like, the disk 32 is rotated and the third limit switch 53 is turned ON. When the third limit switch 53 is ON, the motor 36b is adapted to rotate, and when the disk 32 performs one rotation and the notch 32a returns to the position of the third limit switch, the third limit switch 53 is turned OFF, the motor 36b is stopped from rotating, and the disk 32 is also stopped from rotating.

By adopting such arrangement, while the link 33 performs one cycle of vertical movement, owing to one rotation of the disk 32 of the driving unit 3, the lock mechanism 23 is unlocked, and the seat back 12 is inclined forward up to a posture that the seat back 12 is roughly parallel with the seat cushion 11 by the energizing force of the coil spring 28 (FIG. 5B). At this time, the seat cushion 11 also performs a forward rotation owing to the folding links 14.

When the seat apparatus 1 is set to the table mode or the state to be used as a part of the cargo room by operating the driving unit 3, the projection 26 formed at the seat back side bracket 21 side comes into contact with a notch 44a formed on the sector gear 44 of the rotation unit 4 as shown in FIG. 5B. When the seat apparatus 1 is in the above state, the unlocking lever 24 is held at a position where the lock mechanism 23 is unlocked, and the hook 24a of the unlocking lever 24 is separated away from the first limit switch 51.

On the other hand, when the seat apparatus 1 is returned from the table mode or the state to be used as a part of the cargo room to the ordinary seat state, it is needless to say that the occupant can manually return the seat back 12. However, the seat back 12 can be returned by driving the rotation unit 4 through an operation from a position away therefrom like driver's seat.

When the motor 46c of the motor unit 46 is operated through a switch operation from the driver's seat or the like, the motor gear 46b follows and the transmission gear 45b engaged with the motor gear 46b is also rotated. The rotation force of transmission gear 46b is transmitted to the reduction gear 45a via the gear holding pin 45, the sector gear 44 engaged with the reduction gear 45a is also rotated. When the sector gear 44 rotates, the projection 26 on the seat back side bracket abutting on the notch 44a of the sector gear also rotates, and the seat back side bracket 21 (seat back 12) rotates (return) in the backward inclination direction.

When the seat back side bracket 21 returns to a predetermined position, since the unlocking lever 24 rotates to the locking position by the energizing force of the energizing spring 24b, the lock mechanism 23 gets into the locked state. At the almost same time, the hook 24a of the unlocking lever comes into contact with the first limit switch 51, and the first limit switch 51 is turned ON (FIG. 5C). When the first limit switch 51 is turned ON, the motor 46c rotates in the inversed direction. Then, the sector gear 44 also rotates in the inversed direction up to the original position, and the operation projection 44a formed on the sector gear 44 comes into contact with the second limit switch 52, the second limit switch 52 is turned ON. As a result, the motor 46c is stopped from rotating and the seat apparatus 1 becomes to be used as the seat (FIG. 5A).

When such arrangement that enables remote operation as described above is adopted, if another means is not otherwise taken, each of the driving unit 3 and the rotation unit 4 can be separately operated. Therefore, in the case where one unit is operated while the other unit is in operation, there may be such a case that, even when one unit attempts to cause the seat back 12 to incline forward, the seat back 12 is caused to return to the previous position due to the operation of the other unit; or, even when the seat back 12 is returned, the lock does not function. Therefore, in the present invention, a control circuit 6 that controls the driving unit 3 and a control circuit 7 that controls the rotation unit 4 are adapted so that when one is in operation, the other is prohibited from operating in accordance with the state of the limit switches. The practical configuration of the above will be described below.

FIG. 6 shows a control circuit used in the seat apparatus 1. The control circuit 6 for controlling the driving unit 3 and the control circuit 7 for controlling the rotation unit 4 are interlocked with each other via limit switches, and a state in which both of the limit switch 51 and the limit switch 52 are ON is shown. Switch SW1 is for activating the rotation unit 4 to operate; and switch SW2 is for activating the driving unit 3 to operate. The switch SW1 and SW2 are disposed in a position away from the seat apparatus 1 in the vicinity of the driver's seat or the like, and permit remote operation of the respective units.

When the switch SW2 is turned ON, the power is supplied to a timer relay, the motor 36b is activated to rotate, and the driving unit 3 is driven to operate. And the seat back 12 inclines forward up to a posture roughly parallel with the seat cushion 11. At this time, since the unlocking lever 24 is stopped in a state that the lock mechanism 23 is unlocked, the hook 24a is out of the engagement with the limit switch 51, and the limit switch 51 is turned OFF (in FIG. 6, black dot side). Note that, since the timer relay is preset to operate after a preset time has passed, even when the occupant accidentally touches the switch SW2, malfunction is prevented from occurring.

When the seat back 12 is returned to a position where the seat back 12 can be use as the seat again, the switch SW1 for the rotation unit 4 is operated. Then, the power is supplied to a relay RY5 first, and then, the current flows from the relay RY1 to a relay RY2; thus the motor 46c in the rotation unit 4 is driven to rotate. When the motor 46c rotates, the sector gear 44 rotates and the operation projection 44a formed on the sector gear goes out of the engagement with the limit switch 52, and the limit switch 52 is turned OFF (in FIG. 6, black dot side).

When the sector gear 44 engages with the projection 26 formed on the seat back side bracket and causes the seat back 12 to return, the lock mechanism 23 is locked and the unlocking lever 24 rotates up to the locking position. And, since the hook 24a comes into contact with the limit switch 51, the limit switch 51 is turned ON again. At this time, since the limit switch 52 is in the OFF state, the current flows from a relay RY4 to a relay RY3, the motor 46c rotates in the reversed direction. When the motor 46c rotates in the inversed direction and the sector gear 44 rotates up to the original position, the operation projection 44a comes into contact with the limit switch 52 to turn ON the limit switch 52.

As described above, when the limit switch 51 is ON, such a state is obtained that the unlocking lever 24 is not operated, i.e., the reclining unit 2 is locked. And when the limit switch 52 is ON, such a state is obtained that the sector gear 44 is out of operation, i.e., the rotation unit 4 is out of operation. That is, the circuit diagram shown in FIG. 6 demonstrates that, unless the seat apparatus 1 is in the state to be used as the seat, even when the switch SW2 of the driving unit 3 is turned ON, the power is not supplied to the timer relay. Therefore, when one unit is in operation, the other unit does not operate (can not operate).

Second Embodiment

FIGS. 7 to 11 show a seat apparatus 1 according to a second embodiment. In the seat apparatus 1 according to this embodiment, arrangements such as a "slide position reset mechanism" and a "slide lock reset mechanism" or the like shown in FIGS. 7 and 8 or FIG. 10 are added to the constitution of the seat apparatus according to the first embodiment. The seat apparatus 1 according to the first embodiment is an extremely useful embodiment mode in a point that the seat back 12 can be caused to be "inclined forward" and "returned to a state that occupant can sit thereon" from a position away from the seat apparatus 1. However, even when the angle of the seat back 12 is in the "state that occupant can sit thereon", when the seat apparatus 1 is at the front-most in the forward/backward sliding position, the occupant sitting on the seat apparatus 1 feels constriction in his/her feet and knee. Therefore, the occupant him/herself has to move the seat apparatus manually every time to the vicinity of the rearmost in the forward/backward sliding position. Taking the above problem into consideration, in this embodiment, the "inclination angle of the seat back" and the "forward/backward position of the seat rail 13" are arranged to be interlocked with the returning operation to the state allowing the occupant to sit on. Hereinafter, particularly, arrangements different from those in the first embodiment will be described in detail; and the descriptions of the arrangements common thereto will be omitted.

First of all, the "slide position reset mechanism" will be described. As shown in FIG. 7 or FIG. 8, the slide position reset mechanism according to the present invention is constructed of a "wire winding mechanism" and a "wire cable 64".

The wire winding mechanism is constructed of a rotary drum for winding a wire cable 64 (described later) and a gear 63, which rotates coaxially with the rotary drum and is engaged with the sector gear 44. As shown in FIGS. 7 and 8 or FIG. 9, in this embodiment, the wire winding mechanism is constructed as described below. That is, being interposed with the holding bracket 43, a rotary drum 62a is rotatably disposed at one side; and the other side, a gear 63 is disposed on the extended coaxial line with the rotary drum in a state being engaged with the sector gear 44. Owing to such arrangement, accompanying the rotation of the motor gear 46b and sector gear 44 driven by the operation of the motor 46e, the rotary drum is rotated, and thus the wire cable 64 can be wound. Note that, in the embodiment, the wire-winding drum is constructed of a "first rotary drum 62a" and a "second rotary drum 62b". The rotary drum, which is rotatably disposed with respect to the holding bracket 43 is the "first rotary drum 62a".

On the other hand, one end of the wire cable 64 is connected to the first rotary drum 62a; and the other end thereof is connected to the second rotary drum 62b. As shown in FIG. 7, 9 or 10, since the second rotary drum 62b is provided at the rearmost portion of the seat rail 13 (lower rail), as shown in FIG. 9, from the first rotary drum 62a to the second rotary drum 62b, the wire cable 64 is laid inside the seat rail 13 via a pulley 65 provided in the front end portion of the reclining unit 2. Note that the second rotary drum 62b is constantly energized by a spring in the winding direction of the wire cable 64. Therefore, since a constant tension is maintained between the first rotary drum 62a and the second rotary drum 62b, the wire cable 64 does not slack within the seat rail 13. In the state that the wire cable 64 is contained within the second rotary drum 62b, when the wire cable 64 is pulled, the second rotary drum 62b simply unwinds the wire cable 64 against the energizing force of the spring up to its connected end as the limit. Therefore, even when the reclining unit 2 is manually slid forward/backward by the occupant, extra load is not particularly generated. Note that, when the forward/backward position of the reclining unit 2 is at near the front-most, the second rotary drum 62b is in a state that the wire cable 64 has been unwound up to the almost its limit end. Therefore, in the above state, at a point when the first rotary drum 62a starts winding the wire cable 64 accompanying the rotation of the sector gear 44, the reclining unit 2 is in a state to immediately start the backward sliding.

Therefore, in the seat apparatus 1 according to this embodiment, when the seat back side bracket 21 of the reclining unit 2 moves from a state shown in FIG. 5B to a state shown FIG. 5C accompanying the rotation of the sector gear 44, the first rotary drum 62a winds the wire cable 64, and the reclining unit 2 can be slid from the vicinity of the front-most to the vicinity of the rearmost. After that, owing to the control by the control circuit 7, the sector gear 44 rotates from a state shown FIG. 5C to a state shown in FIG. 5A. At that time, accompanying the rotation of the sector gear 44, since the first rotary drum 62a also rotate, the first rotary drum 62a unwinds the wire cable 64. The unwound wire cable 64 is wound by the second rotary drum 62b to prepare for the next forward sliding.

Next, the "slide lock reset mechanism" will be described. In the present invention, until the seat reclining unit 2 slides to the rearmost, the slide lock reset mechanism maintains a state that the slide lock is released, and after the same has reached to the rearmost, the slide lock is functioned again. As shown in FIG. 10 or FIG. 11, the slide lock reset mechanism in this embodiment is constructed of a holding link 72, a memory link 73, a memory release lever 74 and a rearmost detection hook 75.

The holding link 72 engages with the lock lever 15, which restrains and releases the forward/backward slide lock of the seat rail 13 to pull up and release the lock lever 15. As shown in FIG. 10, in this embodiment, the holding link 72 is formed in a jaw-like shape (hereinafter, referred to as "jaw-like shape portion") in the front-end portion thereof, and an elongated hole having a substantially "L"-like shape is drilled. In this elongated hole, the projection portion on the lock lever 15 of the seat rail 13 abuts and slides thereon. Since the elongated hole is formed in a roughly "L"-like shape, when the occupant manually operates to pull up the lock lever 15, the projection portion of the lock lever 15 slides in the upper half portion of the "L"-like shape. Therefore, when the occupant manually operates the lock lever 15, the holding link 72 is prevented from operating. The holding link 72 is pivoted in the central portion thereof and performs a movement like a seesaw accordingly. On the other hand, the seat back side bracket 21 is provided with a press member 29, and when the seat back side bracket 21 is inclined forward, the press member 29 presses the end portion at the opposite side to the jaw-like shape portion in the holding link 72. Then, since the holding link 72 performs a movement like a seesaw, the jaw-like shape portion is pushed upward. When the jaw-like shape portion is pushed up, the lock lever 15 engaged within the elongated hole is pulled up, and thus the forward/backward slide lock of the seat rail 13 is released.

As shown in FIG. 11, the memory link 73 is arranged so as to come into contact with the lower side of the jaw-like shape portion. The memory link 73 is mounted rotatably and energized in the direction of the holding link 72 by a spring. That is, immediate after the holding link 72 has lifted up the lock lever 15 accompanying the movement of forward inclination of the seat back side bracket 21, the memory link 73, which is energized by the spring, enters to the lower side of the jaw-like shape portion of the holding link 72 to maintain a state that the lock lever 15 is lifted up.

With this rotatable memory link 73, the memory release lever 74 for pushing forward the memory link 73 is interlocked. The memory release lever 74 is disposed along the longitudinal direction of the seat rail 13, and the front-end portion (hereinafter, referred to as "front end portion") at the side opposite to the side where the memory link 73 is interlocked extends toward the rear end of the seat rail 13. The rearmost detection hook 75 is provided at the rear end portion of the seat rail 13 and is arranged so as, after the front end portion of the memory release lever 74 comes into contact therewith, to push the memory release lever 74 forward. Accompanying the forward pushing of the memory release lever 74 by the rearmost detection hook 75, the memory release lever 74 pushes the memory link 73 forward. Owing to this, the contact of the memory link 73 on the lower side of the jaw-like shape portion of the holding link 72 is disengaged, the state that the lock lever 15 is lifted up is released, and the forward/backward slide of the seat rail 13 is locked again.

Therefore, in the seat apparatus 1 according to this embodiment, since the "slide lock reset mechanism" is provided, only when the reclining unit 2 comes (return) closer to the vicinity of the rearmost, the forward/backward slide of the seat rail 13 is locked again without carrying out any operation. Therefore, owing to the operation of the "slide position reset mechanism", being interlocked with returning movement of the inclination angle of the seat back side bracket 21, even when the forward/backward position of the reclining unit 2 on the seat rail 13 is returned up to the vicinity of the rearmost, the forward/backward slide of the seat rail 13 can be locked again with no operation by the occupant.

INDUSTRIAL APPLICABILITY

The seat apparatus 1 according to the present invention is applicable not only to the seats for vehicles but also to a device for operating and returning a walk-in mechanism, by arranging the seat apparatus 1 so that, when the driving unit 3 is activated, the angle adjustment of the forward inclination of the seat back 12 is interlocked with the lock mechanism of the seat rail 13.

BRIEF DESCRIPTION OF THE DRAWINGS

FIG. 4 shows a driving unit provided to the seat apparatus shown in FIG. 1.

FIG. 5 shows a state of the reclining unit and the rotation unit respectively; FIG. 5A shows a state that the seat apparatus can be used as a seat; FIG. 5B shows a state that the seat apparatus can be used in a table mode or a part of a cargo room; and FIG. 5C shows a state that the seat apparatus has been returned to the ordinary position from the table mode.

EXPLANATION OF REFERENCE NUMERALS

Figure 1:
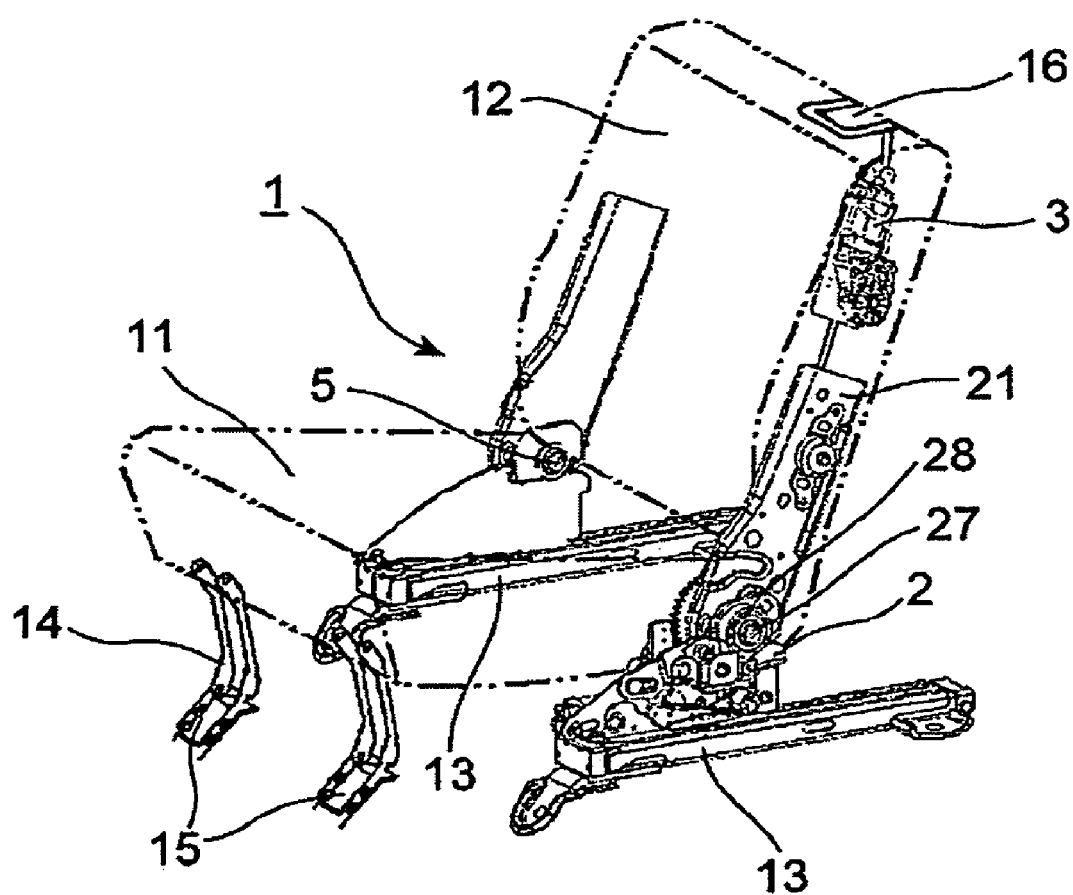
FIG. 1 is a schematic view of a seat apparatus according to the present invention.
Figure 2:
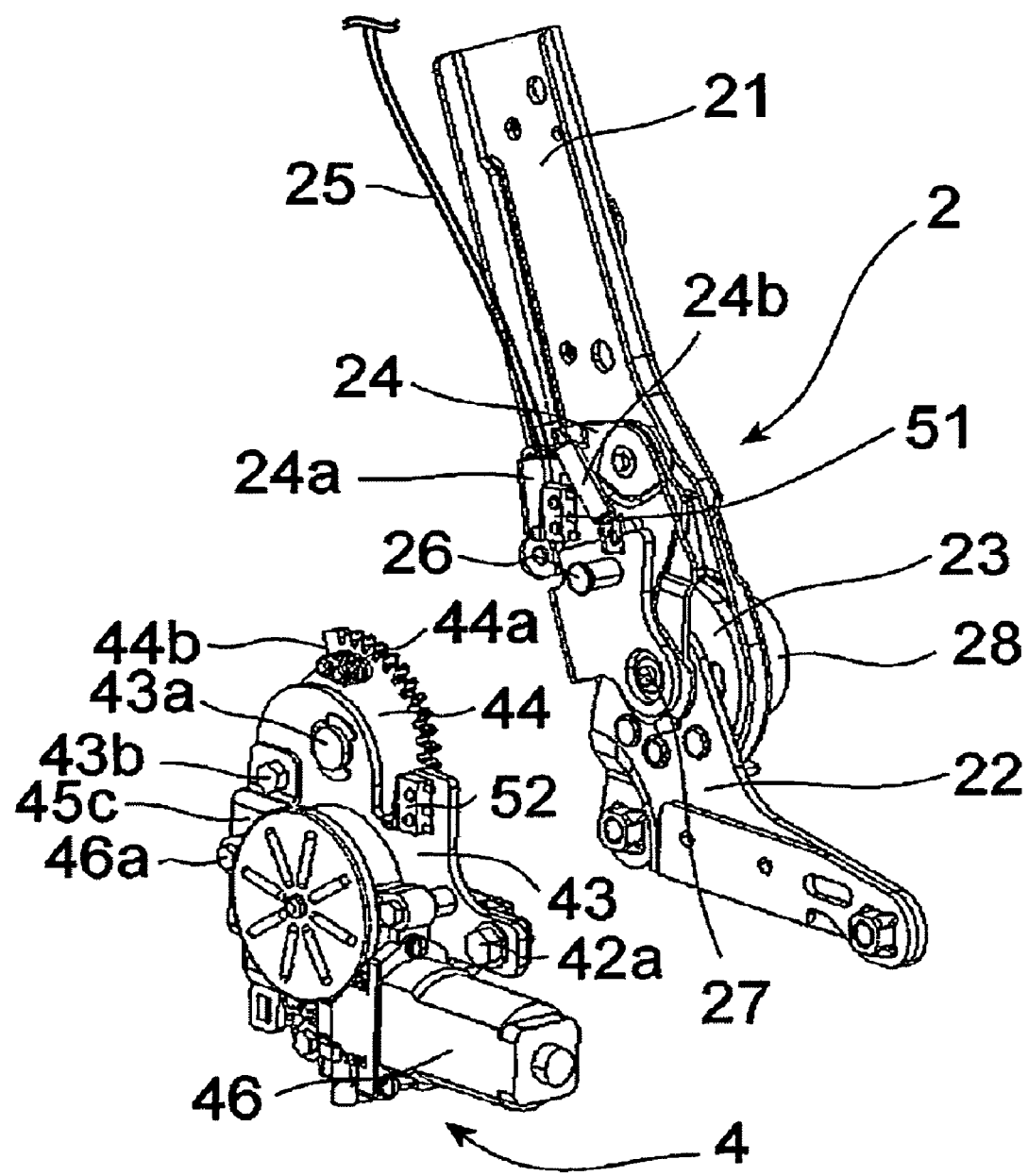
FIG. 2 is a perspective view of a reclining unit provided to the seat apparatus shown in FIG. 1.
Figure 3:
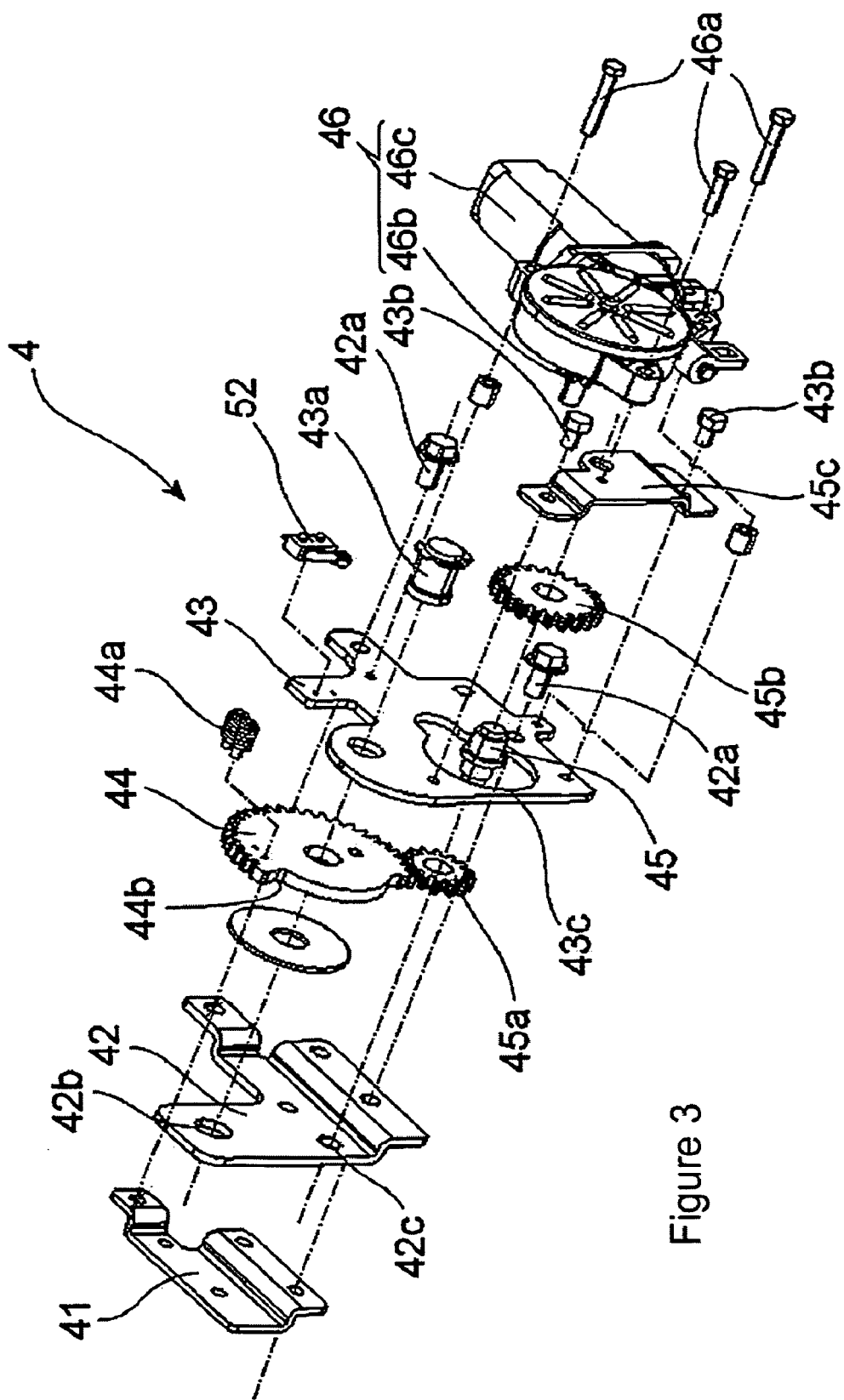
FIG. 3 is an exploded perspective view of a rotation unit provided to the seat apparatus shown in FIG. 1.
Figure 4A:
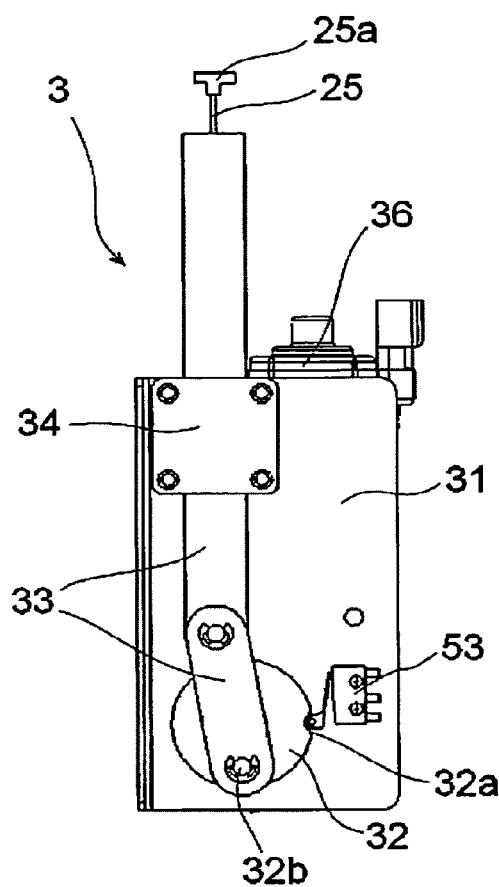
FIG. 4A is a front view thereof.
Figure 4B:
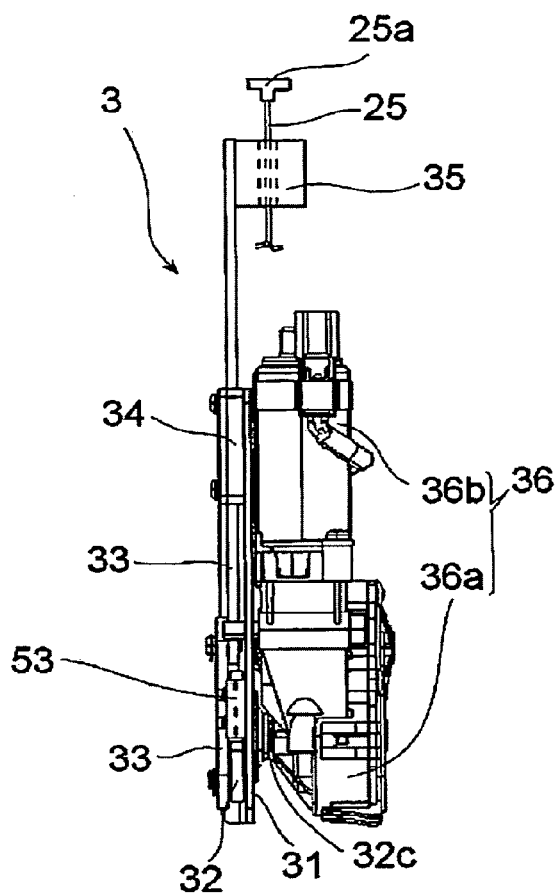
FIG. 4B is a side view thereof.
Figure 6:
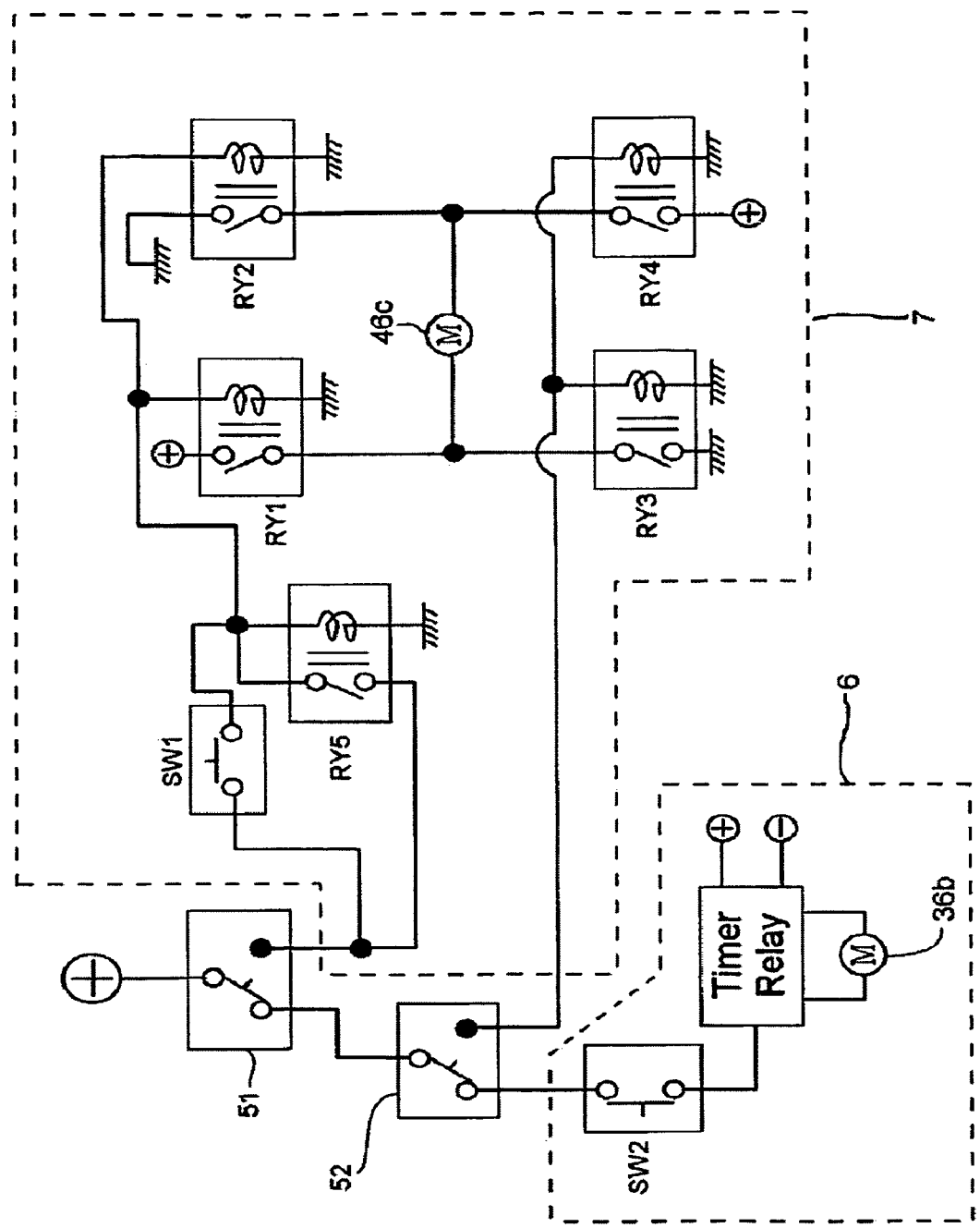
FIG. 6 shows a control circuit used for the seat apparatus shown in FIG. 1.
Figure 7:
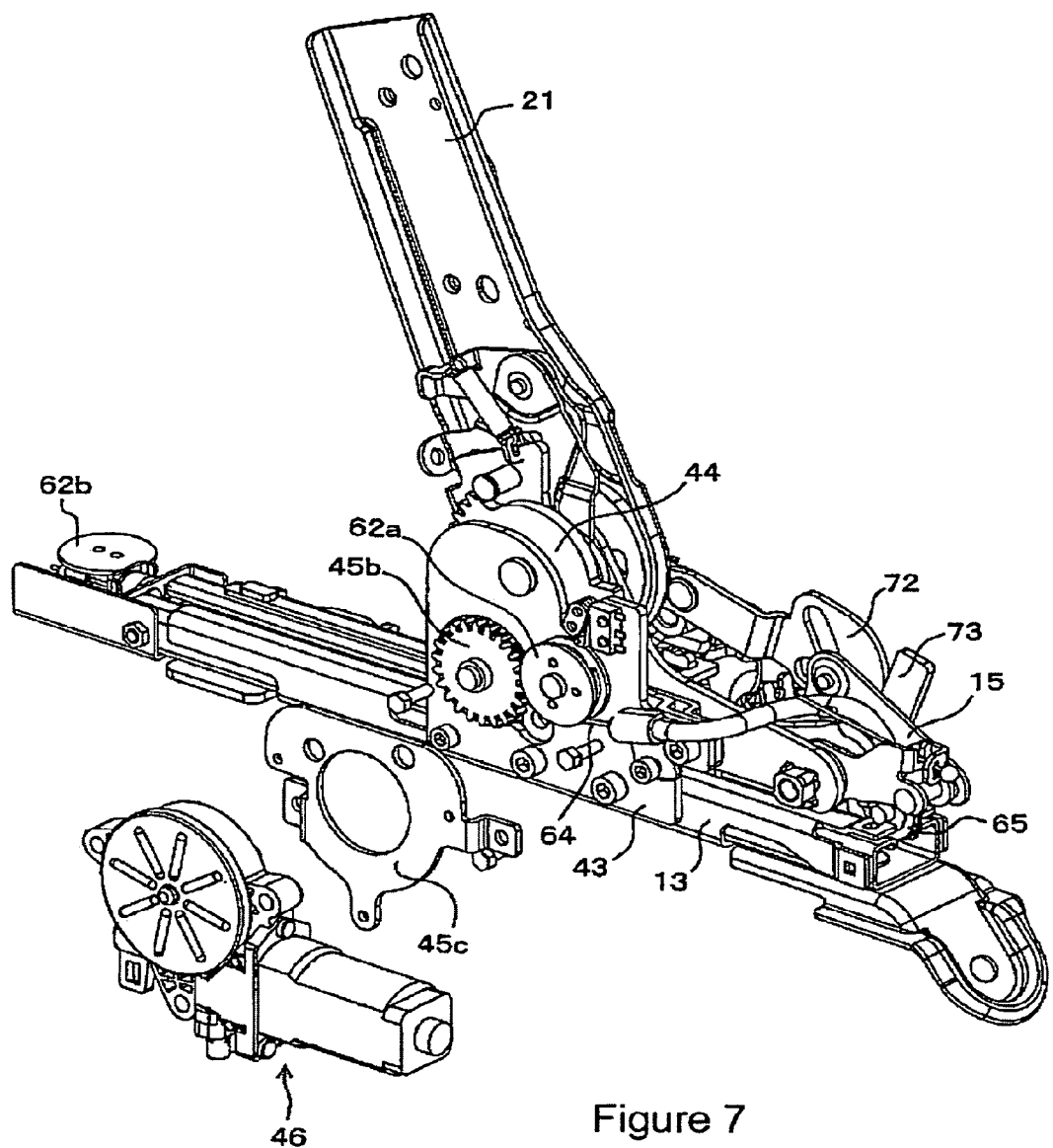
FIG. 7 is an exploded perspective view of a reclining unit according to a second embodiment.
Figure 8:
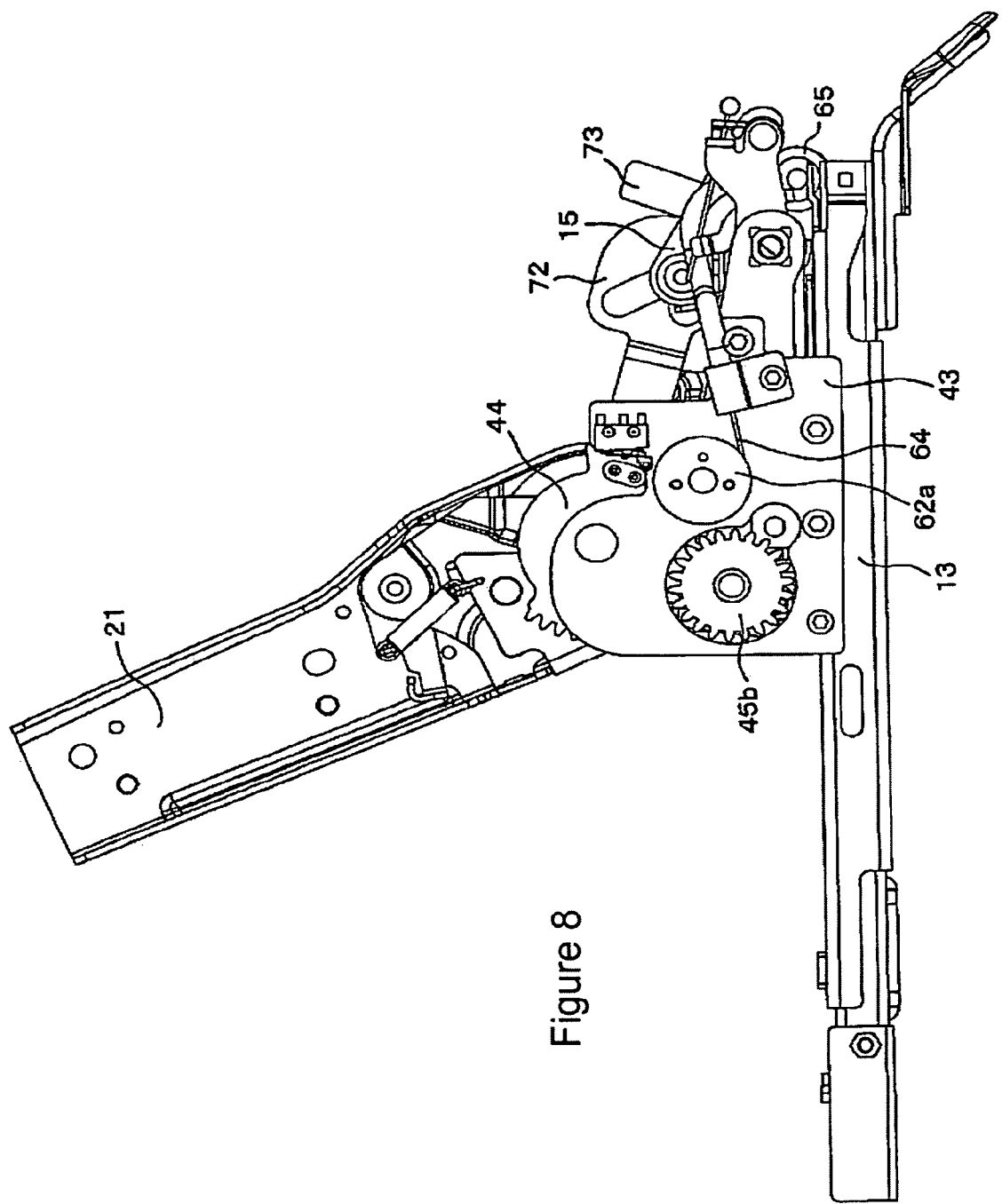
FIG. 8 is a right side view of the reclining unit shown in FIG. 7.
Figure 9:
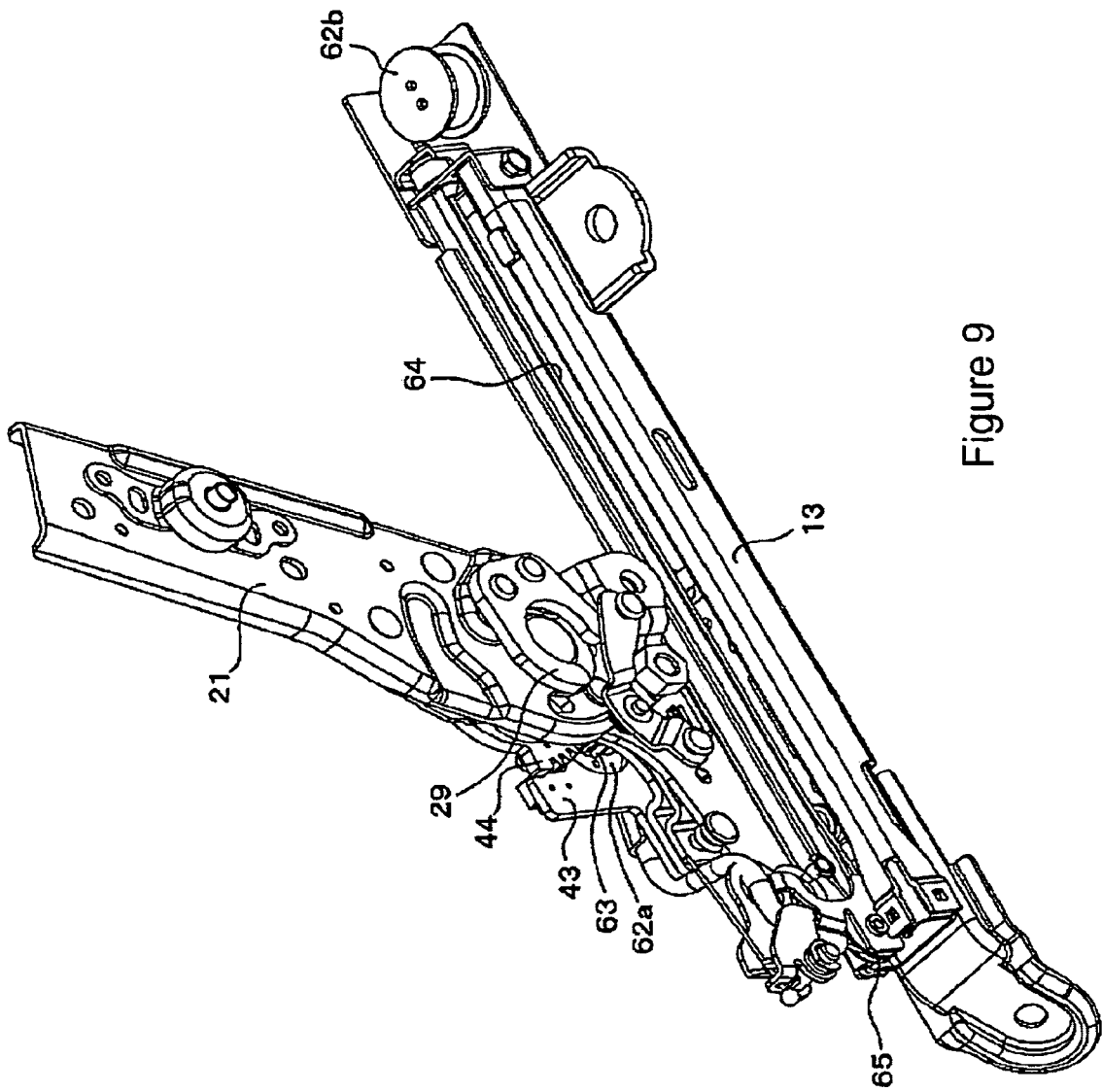
FIG. 9 is a view showing the reclining unit shown in FIG. 7 viewed from a right upper position.
Figure 10:
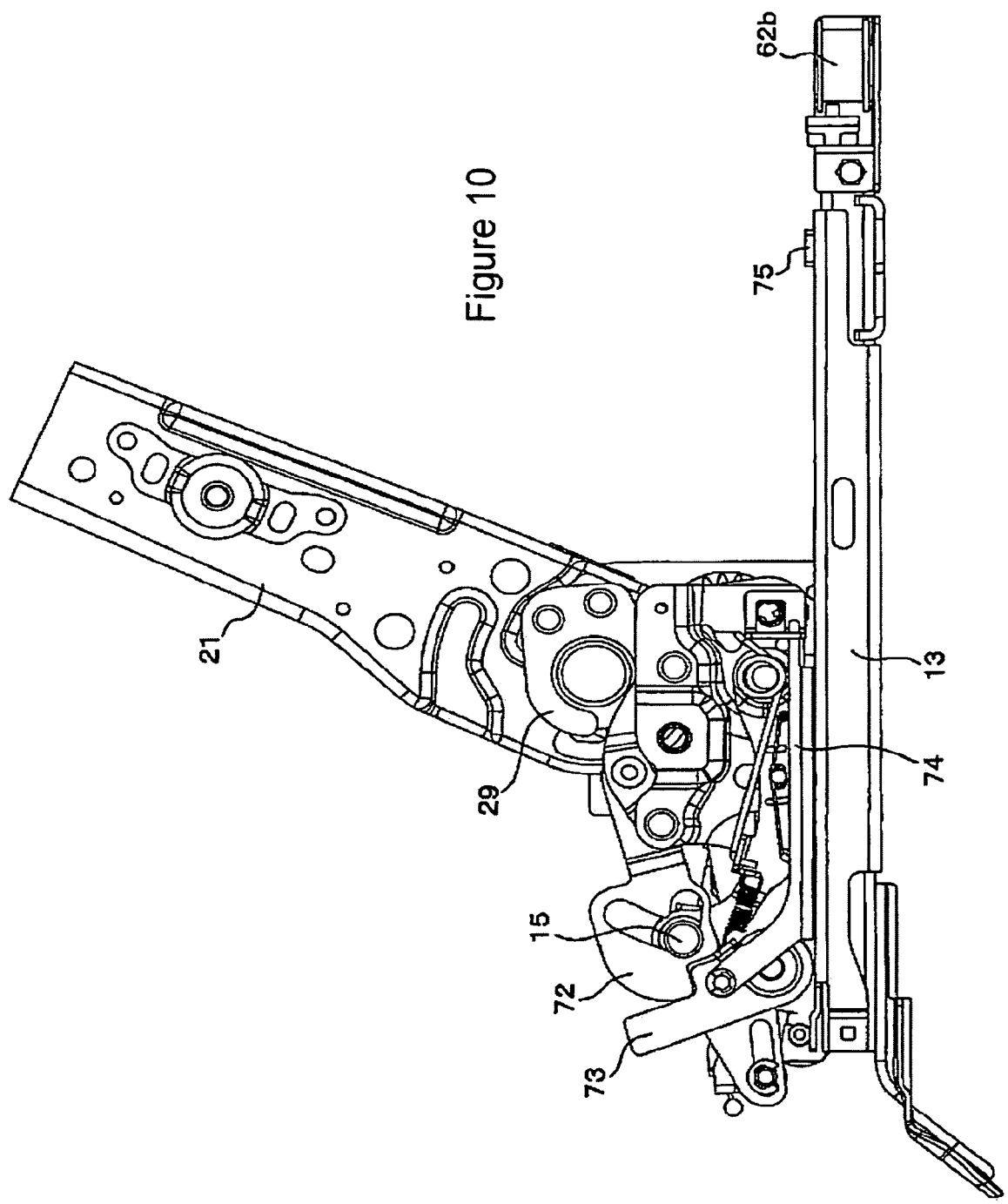
FIG. 10 is a left side view of the reclining unit shown in FIG. 7.
Figure 11:
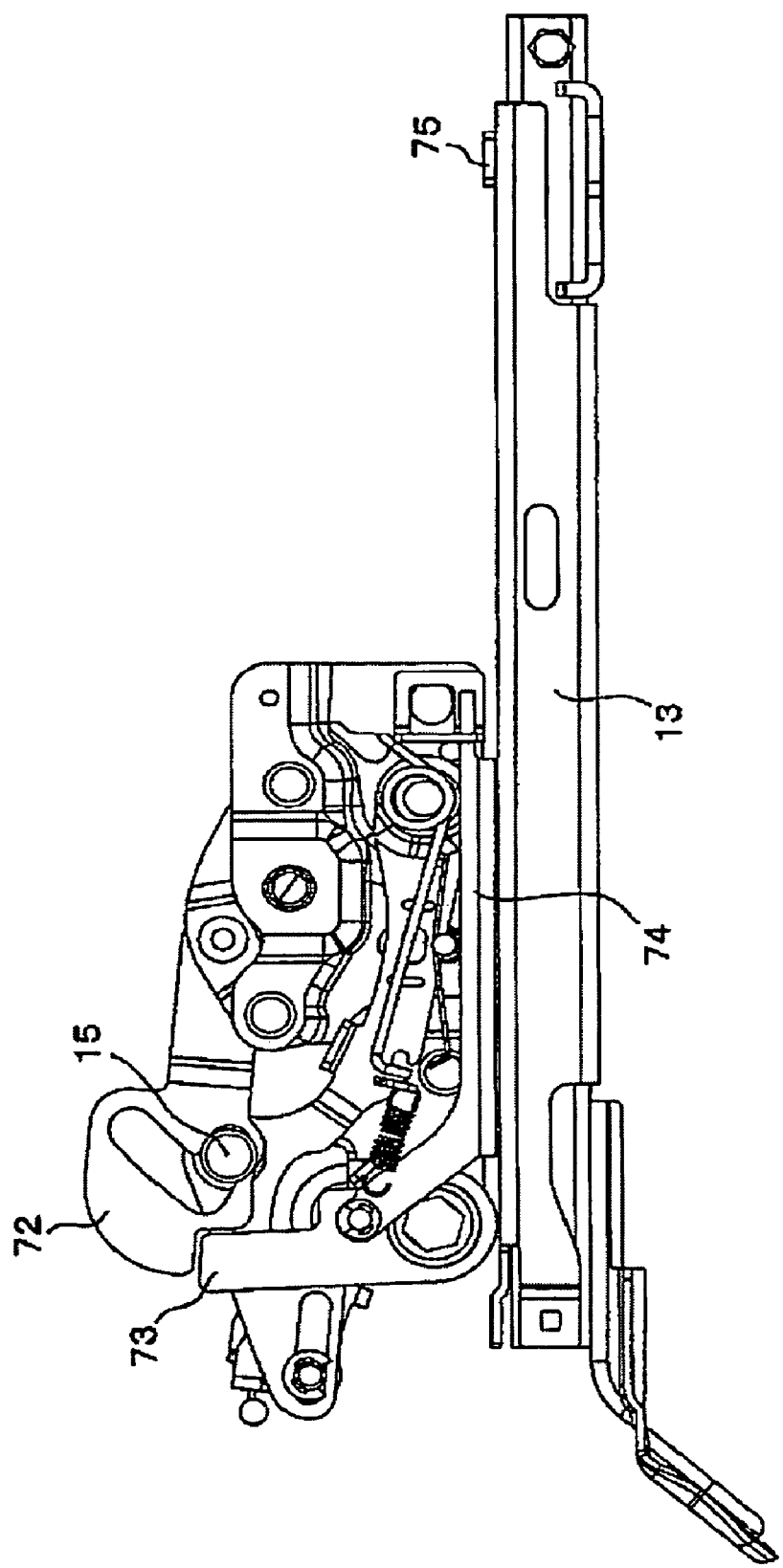
FIG. 11 is a view particularly showing a structure of a slide lock reset mechanism in the reclining unit shown in FIG. 10.

1: seat apparatus
2: reclining unit
3: driving unit
4: rotation unit
5: free hinge
6: control circuit for driving unit
7: control circuit for rotation unit
11: seat cushion
12: seat back
13: seat rail
14: folding link
15: lock lever
16: operation member
21: seat back side bracket
22: seat cushion side bracket
23: lock mechanism
24: unlocking lever
24a: hook
25: wire
26: projection
27: rotary shaft
28: coil spring
29: press member
31: base board
32: disk
32a: notch
32c: rotary shaft
33: link
34: fixed plate
35: link piece
36: motor unit
36b: motor
41: mounting bracket
42: base plate
43: holding bracket
43a: center shaft
44: sector gear
44a: operation projection
44b: notch
45: gear holding pin
45a: reduction gear
45b: transmission gear
45c: gear holding bracket
46: motor unit
46b: motor gear
46c: motor
51: first limit switch
52: second limit switch
53: third limit switch
62a: first rotary drum
62b: second rotary drum
63: gear
64: wire cable
65: pulley
72: holding link
73: memory link
74: memory release lever
75: rearmost detection hook

The invention claimed is:

1. A seat apparatus comprising:
a seat cushion;
a seat back attached to the seat cushion and inclinable with respect to said seat cushion; and
a reclining unit operable to adjust an inclination angle of the seat back with respect to the seat cushion;
wherein said seat back is inclinable to an arbitrary position when a lock of said reclining unit is released with an unlocking device;
wherein a rotation unit capable of rotating said inclined seat back is attached to said reclining unit, and said rotation unit is operable from a position away from the seat back in an interior of a vehicle;
wherein said reclining unit has a seat back side bracket attached to said seat back, and the seat back side bracket includes a projection;
wherein said rotation unit includes a motor and a rotating member, wherein the rotating member is driven to rotate by the motor and includes a notch engageable with said projection;
wherein when said rotating member is driven to rotate by said motor, said notch is engaged with said projection, and when said seat back side bracket is rotated, said seat back is rotated;
wherein said reclining unit is fixed to a seat cushion side bracket, wherein the seat cushion side bracket is fixed to an upper rail in a seat rail assembly, and wherein the upper rail is engaged slidably with respect to a lower rail adapted to be fixed to a floor face of the vehicle;
wherein said reclining unit includes a rotary drum that rotates simultaneously together with the rotating member of the rotation unit;
wherein the rotary drum is connected to one end of a wire cable and another end of the wire cable is connected to an end portion of said lower rail; and
wherein the rotary drum rotates simultaneously together with said rotating member to wind the wire cable, and thereby the reclining unit on said upper rail slides on the lower rail.

2. The seat apparatus according to claim 1, wherein the upper rail in said seat rail assembly includes a lock lever for restraining or releasing the upper rail to slide with respect to the lower rail;

wherein the seat cushion side bracket fixed onto said upper rail includes:
- a holding link that, when the seat back is inclined forward, engages with said lock lever and operates the lock lever to release the slide restriction with respect to the lower rail;
- a memory link configured to engage with the holding link and to release the holding link to maintain a state in which the holding link has released the slide restriction; and
- a memory release lever connected to the memory link at one end portion of the memory link and operable to release engagement with the holding link by the memory link; and wherein, when another end portion of the memory release lever comes into contact with a rearmost detection hook on the lower rail, the memory link interlocked with one end portion of the memory release lever is pushed to release the engagement with the holding link by the memory link and releases the operation of the lock lever by the holding link, and thereby the slide restriction of the upper rail with respect to the lower rail is resumed.

3. A seat apparatus comprising:

a seat cushion;

a seat back attached to the seat cushion and inclinable with respect to the seat cushion; and a reclining unit operable to adjust an inclination angle of the seat back with respect to the seat cushion;

wherein the reclining unit is fixed to a seat cushion side bracket, wherein the seat cushion side bracket is fixed to an upper rail in a seat rail assembly in which assembly the upper rail is engaged slidably with respect to a lower rail adapted to be fixed to a floor face of a vehicle;

wherein the reclining unit includes a rotary drum that rotates simultaneously together with a rotating member of a rotation unit;

wherein the rotary drum is connected to one end of a wire cable and another end of the wire cable is connected to the lower rail; and wherein the rotary drum rotates simultaneously together with the rotating member to wind the wire cable, and thereby the reclining unit on the upper rail slides with respect to the lower rail.

4. The seat apparatus of claim 3, wherein said seat back can be inclined to an arbitrary position when a lock of said reclining unit is released with an unlocking device.

5. The seat apparatus of claim 4, wherein said unlocking device comprises:

an unlocking lever for unlocking said reclining unit;

a connecting member connected to the unlocking lever;

an operation member configured to operate said unlocking lever via the connecting member; and a driving unit operable from a position away from the seat cushion in an interior of the vehicle to operate said unlocking lever via said connecting member in place of operating the operation member;

wherein said driving unit includes a motor, a disk driven to rotate by the motor, a link attached to the disk, wherein the link is arranged to perform a linear movement when the disk performs a rotational movement, and a link piece attached to an end portion of the link, through which said connecting member is slidably inserted and which is capable of being engaged with a front end of said connecting member;

wherein, when said link performs a linear movement, said link piece is engaged with the front end of said connecting member to operate said connecting member and thereby to operate said unlocking lever.

6. The seat apparatus of claim 5, wherein said driving unit and a rotation unit operable to rotate the seat back are configured so that the operations of those units are detected through a control circuit configured to prevent one of those units from operating while the other unit is in operation.

7. The seat apparatus of claim 3, wherein a rotation unit operable to rotate said seat back is attached to said reclining unit, and said rotation unit is operable from a position away from the seat cushion in the interior of the vehicle.

8. The seat apparatus of claim 7, and further comprising a seat back side bracket attached to said seat back;

wherein the seat back side bracket includes a projection;

wherein said rotation unit includes a motor and a rotating member;

wherein said rotating member is driven to rotate by the motor;

wherein said rotating member includes a notch that is engageable with said projection; and wherein when said rotating member is driven to rotate by said motor, said notch is engaged with said projection, and when said seat back side bracket is rotated, said seat back is rotated.

9. The seat apparatus of claim 8, wherein said rotation unit is configured so that when said seat back is moved from an inclined state to an upright state and said reclining unit is locked, the engagement between the notch of said rotating member and the projection of said seat back side bracket is released through an electrical control to return said Beat back to a configuration it was in before the seat back was moved.

10. The seat apparatus of claim 7, wherein said rotation unit is configured so that rotary shafts of said reclining unit and said rotating member are coaxial with one another.

* * * * *

UNITED STATES PATENT AND TRADEMARK OFFICE
CERTIFICATE OF CORRECTION

PATENT NO. : 7,500,719 B2  
APPLICATION NO. : 11/420796  
DATED : March 10, 2009  
INVENTOR(S) : Kiyoyuki Kojima Page 1 of 1

It is certified that error appears in the above-identified patent and that said Letters Patent is hereby corrected as shown below:

On the Title Page, Item (73) should read:

Assignees:  Imasen Denki Seisakusho, K.K., Inuyama (JP); Nihon Hatsujo, K.K., Yokohama (JP)

Signed and Sealed this

Twenty-fourth Day of November, 2009

David J. Kappos
*Director of the United States Patent and Trademark Office*